Oct. 6, 1970 G. C. BALLMAN 3,532,934
MEANS FOR PROTECTING AGAINST ELECTRICAL OVERLOAD IN A SATURABLE TRANSFORMER
Filed June 10, 1968
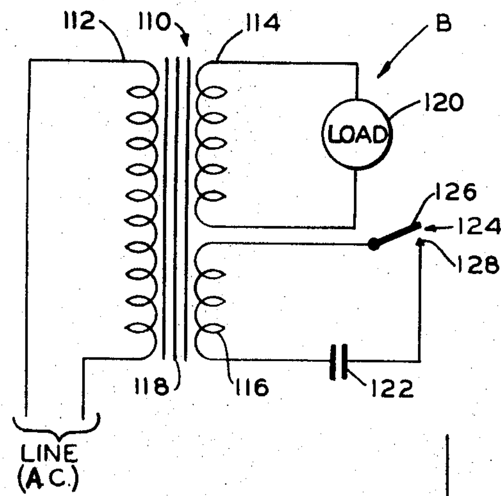
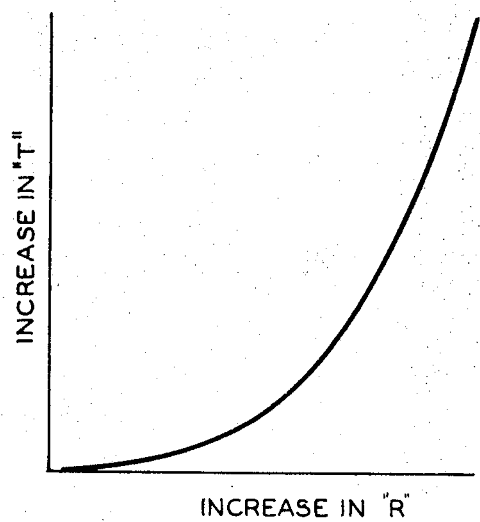
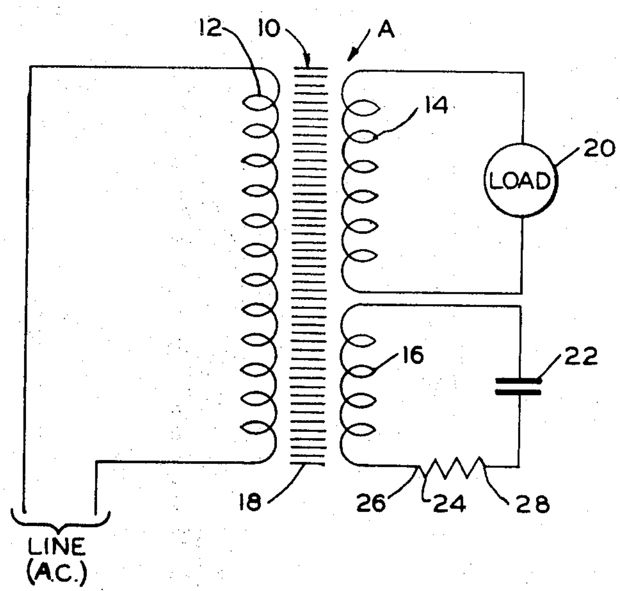
INVENTOR
GRAY C. BALLMAN
BY Joseph A. Fenlon
ATTORNEY United States Patent Office 3,532,934

Patented Oct. 6, 1970

3,532,934

MEANS FOR PROTECTING AGAINST ELECTRICAL OVERLOAD IN A SATURABLE TRANSFORMER

Gray C. Ballman, 30 Portland Drive, St. Louis County, Mo. 63131

Filed June 10, 1968, Ser. No. 735,780
Int. Cl. H02h 5/04, 7/04
U.S. Cl. 317—14 5 Claims

ABSTRACT OF THE DISCLOSURE

The disclosure relates to saturable transformers which are used to deliver substantial quantities of current to loads of known characteristics, and shows a means and method for preventing damage due to overload condition by altering the impedance characteristics of a second balanced circuit having substantially less current flowing therethrough.

This invention relates to electrical overload protective measures and devices.

In present day battery chargers, overload protective devices are used in series with the batteries. Such devices are usually made responsive either to current (such as a fuse) or to the temperature of a given point in the system (such as a Klixon type device). These devices, upon actuation, break the circuit, causing the charging current to cease. Because the magnitudes of the currents broken are usually high, these protective devices require frequent replacement and, in addition, are expensive to maintain.

It is the object of this invention to provide a means and method for protecting a high amperage circuit against overload through independent circuits carrying currents of substantially smaller amperage.

With the above and other objects in view, which will become immediately apparent upon the reading of this specification, my invention resides in the unique and novel form, arrangement, construction and combination of the various parts and steps hereinafter described and claimed.

In the drawings:

FIG. 1 presents an electrical schematic of a preferred embodiment of my invention;

FIG. 2 presents a suitable temperature resistance curve for a thermistic protective device;

FIG. 3 presents a second embodiment of my invention.

Referring now in more detail and by reference character to FIG. 1 of the drawings, which illustrates a preferred embodiment of my invention, A designates a protective device comprising a saturable transformer 10 including a primary winding 12, and two secondary windings 14 and 16, all wound about a saturable core 18. The secondary winding 14 delivers the current to a load 20 which is preferably though not necessarily a conventional battery charging current and the other secondary winding 16 is connected to a capacitor 22 and the resistance terminals 26, 28 of a thermistor 24 having temperature response characteristics similar to those shown in FIG. 2. The body of the thermistor 24 is physically attached to the core 18 between windings 12 and 14 so that the temperatures of the core 18, windings 12 and 14 and the thermistor 24 will be substantially the same at all times.

As is customary with saturable transformers in battery charging circuits, the transformer A is designed to be operating at full rated load when the load 20 is applied across the secondary winding 14, and current is flowing from the winding 16 through the capacitor 22, which has been selected to provide offsetting capacitive reactance for the loads known inductive reactance. Under these conditions, the core 18 and the windings 12 and 14 will assume a determinable operating temperature, design load current will flow to the load 20, and a small amount of current will flow through the secondary winding 16, the capacitor 22 and the terminals 26, 28 of the thermistor 24. If load conditions change for example, by line voltage variation, as is common with battery charging applications, increased current delivered to the load 20 will increase the temperature of the core 18 and the windings 12 and 14, and thermistor 24, thereby causing the resistance across the terminals 26, 28 of the thermistor 24 to increase. As the resistance of the thermistor 24 increases, the current in the circuit supplied by the secondary winding 16 will decrease which in turn will cause the amount of current delivered to the load 20 by the winding 14 to decrease substantially. As long as the overload condition remains, the resistance of the thermistor 24 will be greater than normal, and the current delivered to the load will remain reduced until such time as the overload condition is removed.

This type of protective device is particularly useful in battery chargers where it is desired that maximum charging current be delivered to batteries within the design limitations of the battery charger to provide minimum recharge periods. This is even further more useful when it is considered that the necessity of interrupting large currents to accomplish this end is eliminated.

FIG. 3 shows a second preferred embodiment of the invention. In FIG. 3, B represents a protective device including a transformer 110 comprising a primary winding 112, and two secondary windings 114 and 116, all wound about a saturable core 118. The secondary winding 114 delivers load current to a load 120 and the other secondary winding is connected to a capacitor 122 and a temperature responsive switch 124, adapted to break continuity between its terminals 126, 128, when its temperature exceeds a predetermined level. In similar fashion to the protective device A, overload of the device B causes the temperature of the core 118 and windings 112 and 114 to increase to a level sufficient to actuate the switch 124, breaking continuity betwen the terminals 126, 128, and thereby opening the circuit presented to the secondary winding 116. This causes an immediate decrease in the current delivered to the load 120. The reduced current will continue to be delivered to the load 120 until the switch 124 is reset. Since the amount of current flowing through the secondary 116 is comparatively small, the life of the switch 124 becomes substantially greater.

It should be noted that changes and alterations may be made and substituted in the form, arrangement, combination and construction of the various parts and steps herein shown without departing from the nature and principle of my invention.

Having thus described my invention, what I claim and desire to secure by Letters Patent is recited in the following claims.

I claim:

1. A device for protecting against electrical overload, said device comprising a transformer having a saturable core around which is wound a primary winding and first and second secondary windings, a source of electrical power connected to the primary winding, first circuit means for delivering substantial quantities of current to a predetermined load, second circuit means for delivering small amounts of current to a capacitance, said first circuit means including the first secondary winding, said second circuit means including the second secondary winding, said first circuit means and second circuit means also including mutually offsetting inductive and capacitive reactances under normal full load conditions, said saturable core being predesigned to be operating at full magnetic saturation under normal predetermined load conditions, and temperature responsive means for altering the impedance characteristics of the second circuit means but not the first circuit means when the temperature of the transformer exceeds a predetermined value.

2. The device of claim 1 wherein the temperature responsive means comprises a thermistor having a resistance which increases with temperature.

3. The device of claim 1 wherein the temperature responsive means comprises a thermistor having a resistance which increases with temperature and which is physically mounted on the transformer for equi-temperature operation therewith.

4. The device of claim 1 wherein the temperature responsive means comprises a thermistor having a resistance which increases with temperature at a predetermined rate so as to limit output current to full rated load thereby regulating the transformer output independently of line voltage variations.

5. The device of claim 1 wherein the temperature responsive means comprises a circuit breaking device which will stop the operation of the second circuit means when the temperature of the transformer exceeds a predetermined value.

References Cited

UNITED STATES PATENTS 3,195,015 7/1969 Astleford et al. -------- 317—14.7

J D MILLER, Primary Examiner

W. J. SMITH, Assistant Examiner

U.S. Cl. X.R.

317—20, 40